US012591577B2

(12) United States Patent
An et al.

(10) Patent No.: US 12,591,577 B2
(45) Date of Patent: Mar. 31, 2026

(54) METHOD FOR APPLYING DYNAMIC DATA BLOCK CACHING AUTOMATION FOR HIGH-SPEED DATA ACCESS BASED ON COMPUTATIONAL STORAGE

(71) Applicant: Korea Electronics Technology Institute, Seongnam-si (KR)

(72) Inventors: Jae Hoon An, Incheon (KR); Young Hwan Kim, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 18/902,043

(22) Filed: Sep. 30, 2024

(65) Prior Publication Data

US 2025/0156421 A1 May 15, 2025

(30) Foreign Application Priority Data

Nov. 14, 2023 (KR) ........................ 10-2023-0157132

(51) Int. Cl.
| | |
|---|---|
| *G06F 15/16* | (2006.01) |
| *G06F 16/2455* | (2019.01) |
| *G06F 16/27* | (2019.01) |

(52) U.S. Cl.
CPC ........ *G06F 16/24552* (2019.01); *G06F 16/27* (2019.01)

(58) Field of Classification Search
CPC ............................ G06F 16/24552; G06F 16/27
See application file for complete search history.

(56) References Cited

U.S. PATENT DOCUMENTS

| | | | | |
|---|---|---|---|---|
| 2017/0132293 | A1* | 5/2017 | Bourbonnais | ......... G06F 16/245 |
| 2017/0185458 | A1* | 6/2017 | Chaffin | ...................... G06F 9/52 |
| 2019/0042424 | A1* | 2/2019 | Nair | ..................... G06F 16/1748 |
| 2020/0137141 | A1* | 4/2020 | Mannengal | ............. H04L 9/088 |

OTHER PUBLICATIONS

Lee, Kitaek, et al. "Deploying Computational Storage for HTAP DBMSs Takes More Than Just Computation Offloading." Proceedings of the VLDB Endowment 16.6 (2023): 1480-1493.

Jun, et al. "Database storage engine design based on Computational Storage Device (CSD) to improve the performance of database management systems (DBMS)" Intelligent IDC Project Office, Korea Electronics Technology Institute, 2021, (Abstract in English, 3 pages in Korean).

Korean Office Action issued on Sep. 5, 2024, in counterpart Korean Patent Application No. 10-2023-0157132 (5 pages in English, 7 pages in Korean).

* cited by examiner

*Primary Examiner* — Alex Gofman
(74) *Attorney, Agent, or Firm* — NSIP Law

(57) ABSTRACT

There is provided a dynamic data block caching automation application method for high-speed data access based on a computational storage. A query execution method according to an embodiment includes the steps of: synchronizing, by a DBMS, an ECC which is a cache of the DBMS and an ICC which is a cache of a computational storage in which a DB is established; generating an offloading execution code that defines operation information necessary for query computation offloading based on a query requested by a client; and processing the offloading execution code by using the ECC and the ICC which are synchronized. Accordingly, a load even in a CSD for reducing a load of a DBMS is reduced through snippet offloading reduction, snippet processing reduction, and high-speed query processing is enabled by disk I/O optimized data access.

13 Claims, 4 Drawing Sheets

123/220

ECC/ICC Manager

Cache Data Management
Read  Delete
Write  Update

Cache Data
Table  Block  Row  Column

Sync Bus
ECC  Cache  ICC  Cache

Cache Replacement Algorithm
FIFO  LFU  LRU

123/220

METHOD FOR APPLYING DYNAMIC DATA BLOCK CACHING AUTOMATION FOR HIGH-SPEED DATA ACCESS BASED ON COMPUTATIONAL STORAGE

CROSS-REFERENCE TO RELATED APPLICATION(S) AND CLAIM OF PRIORITY

This application is based on and claims priority under 35 U.S.C. § 119 to Korean Patent Application No. 10-2023-0157132, filed on Nov. 14, 2023, in the Korean Intellectual Property Office, the disclosure of which is herein incorporated by reference in its entirety.

BACKGROUND

Field

The disclosure relates to a database (DB) system, and more particularly, to a method for accessing data at high speed in an environment in which query computations are divided and are offloaded onto computational storage driver (CSD) storages in a DB system which uses a plurality of CSDs as storages.

Description of Related Art

In a query execution process, a database management system (DBMS) acquires data by scanning a query in a DB, filters the acquired data, and returns only the filtered data to a client. However, if there is a lot of data to be scanned in the DB, a large amount of data is transmitted from the storage in which the DB is established to the DBMS. Accordingly, the storage may be implemented by using a CSD which is capable of computing to be able to perform some query computations.

However, to do this, the CSD should receive some query computations and should scan and filter data. Therefore, if such processes become excessive, speed degradation may occur due to increased network usage and increased disk input/output (I/O) usage.

SUMMARY

The disclosure has been developed in order to solve the above-described problems, and an object of the disclosure is to provide a method for operating and managing a DB-dedicated cache in a DBMS and a CSD as a solution to reduce a load in the CSD which is introduced to reduce a load in the DBMS.

To achieve the above-described object, a query execution method according to an embodiment may include the steps of: synchronizing, by a DBMS, an external computational cache (ECC) which is a cache of the DBMS and an internal computational cache (ICC) which is a cache of a computational storage in which a DB is established; generating, by the DMBS, an offloading execution code that defines operation information necessary for query computation offloading based on a query requested by a client; and processing, by the DBMS, the offloading execution code by using the ECC and the ICC which are synchronized.

The step of processing may include processing the offloading execution code by distinguishing by at least one of ECC scanning, ICC scanning, CSD scanning by using the ECC and the ICC which are synchronized.

The step of processing may include: a first identification step of identifying, by the DMBS, whether data exists in the ECC; a second identification step of, when it is identified that the data exists in the ECC at the first identification step, identifying, by the DBMS, whether all of the data that is recorded on the offloading execution code and needs to be scanned exist in the ECC; and a step of, when it is identified that all of the data exist in the ECC at the second identification step, processing, by the DBMS, the offloading execution code in the ECC.

When it is identified that all of the data exist in the ECC at the second identification step, the DBMS may not deliver the offloading execution code to the computational storage.

The query execution method according to the disclosure may further include: a step of, when it is identified that all of the data do not exist in the ECC at the second identification step, delivering, by the DBMS, the offloading execution code to the computational storage; a third identification step of identifying, by the computational storage, whether data exists in the ICC; and a step of, when it is identified that the data exists at the third identification step, scanning, by the computational storage from the ICC, the data that is recorded on the offloading execution code and needs to be scanned.

The query execution method according to the disclosure may further include a step of scanning, by the computational storage from a CSD, data that does not exist in the ICC.

The query execution method according to the disclosure may further include: a step of, when it is identified that the data does not exist in the ECC at the first identification step, delivering, by the DBMS, the offloading execution code to the computational storage; a fourth identification step of identifying, by the computational storage, whether the data exists in the ICC; and a step of, when it is identified that the data exists in the ICC at the fourth identification step, scanning, by the computational storage from the ICC, the data that is included in the offloading execution code and needs to be scanned.

The query execution method according to the disclosure may further include a step of scanning, by the computational storage from a CSD, data that does not exist in the ICC.

The query execution method according to the disclosure may further include a step of, when it is identified that the data does not exist in the ICC at the fourth identification step, scanning, by the computational storage, all of the data that needs to be scanned from the CSD.

According to another aspect of the disclosure, there is provided a DB system including: a computational storage in which a DB is established; and a DBMS configured to synchronize an ECC and an ICC of the computational storage, to generate an offloading execution code that defines operation information necessary for query computation offloading based on a query requested by a client, and to process the offloading execution code by using the ECC and the ICC which are synchronized.

According to still another aspect of the disclosure, there is provided a query execution method including the steps of: generating, by a DMBS, an offloading execution code that defines operation information necessary for query computation offloading based on a query requested by a client; and processing, by the DBMS, the offloading execution code by using an ECC which is a cache of the DBMS.

According to yet another aspect of the disclosure, there is provided a DB system including: a computational storage in which a DB is established; and a DBMS configured to generate an offloading execution code that defines operation information necessary for query computation offloading based on a query requested by a client, and to process the offloading execution code by using an ECC and an ICC of the computational storage.

According to embodiments of the disclosure as described above, the ECC is introduced in the DBMS and the ICC is introduced in the CSD and the ECC and the ICC are synchronized with each other, so that a load even in the CSD for reducing a load of the DBMS is reduced through snippet offloading reduction, snippet processing reduction, and high-speed query processing is enabled by disk I/O optimized data access.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure provide a dynamic data block caching automation applying method for high-speed data access based on a computational storage. Embodiments relate to a technology for a DBMS and a CSD to operate and manage a DB-dedicated cache as a solution to reduce a load of the CSD which is introduced to reduce a load of the DBMS.

Figure 1:
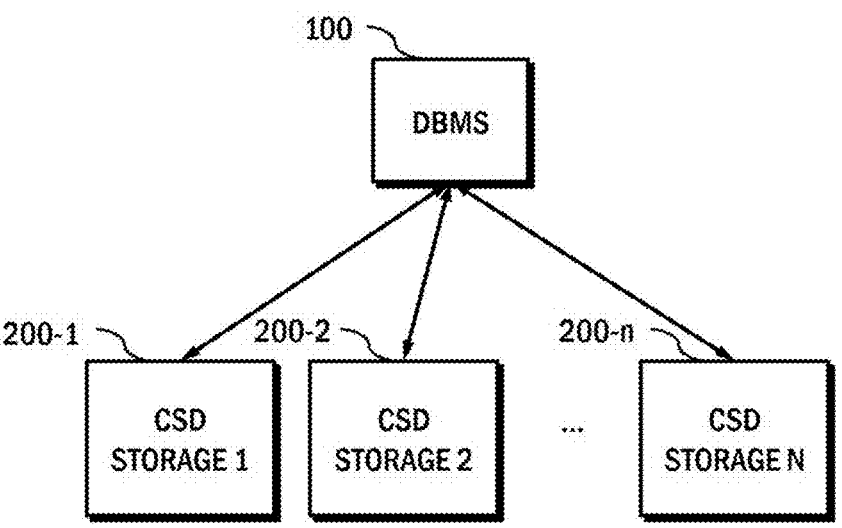
FIG. 1 is a view illustrating a computational storage-based DB system according to an embodiment of the disclosure.

FIG. 1 is a view illustrating a configuration of a computational storage-based DB system according to an embodiment of the disclosure. As shown in FIG. 1, the DB system according to an embodiment may include a DBMS 100 and a plurality of CSD storages 200-1, 200-2, . . . , 200-n.

The CSD storages 200-1, 200-2, . . . , 200-n refer to storage nodes in which DBs all or a part of which overlaps are established. A plurality of CSD storages 200-1, 200-2, . . . , 200-n may be implemented to process many queries which are requested simultaneously. Furthermore, the CSD storages 200-1, 200-2, . . . , 200-n may include computation functions to perform some of query computations.

The DBMS 100 is a node that executes a query according to a request of a client (not shown) and returns a result. All of the query computations are not performed by the DBMS 200, and some of the query computations may be offloaded (pushed down) onto the CSD storages 200-1, 200-2, . . . , 200-n.

Figure 2:
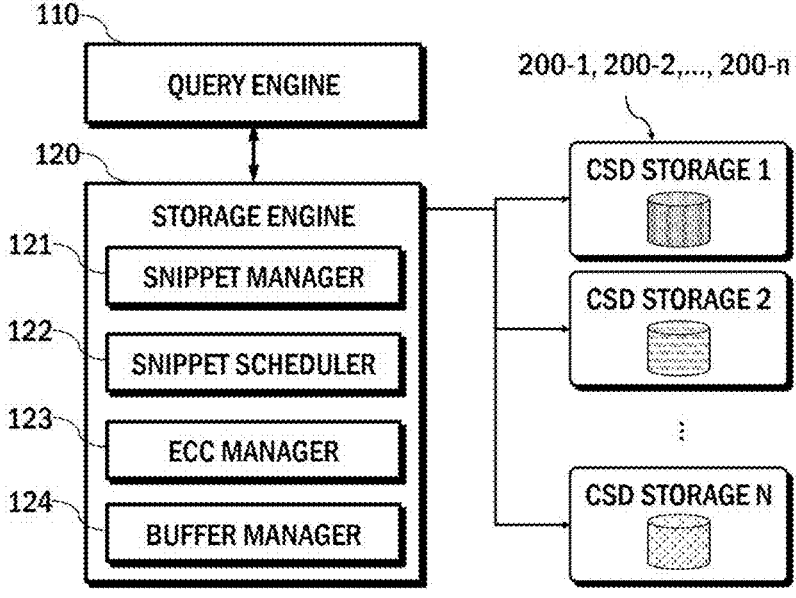
FIG. 2 is a view illustrating a configuration of a DBMS.

FIG. 2 is a view illustrating a configuration of the DBMS 100 shown in FIG. 1. As shown in FIG. 2, the DBMS 100 may include a query engine 110 and a storage engine 12. Upon receiving a query execution request from a client, the query engine 110 may optimize the received query and may deliver the query to the storage engine 120.

The storage engine 120 may offload some of query computations onto the CSD storages 200-1, 200-2, . . . , 200-n. Some query computations may include query scanning, filtering, validation, etc. To perform this, the storage engine 120 may include a snippet manager 121, a snippet scheduler 122, an ECC manger 123, and a buffer manager 124.

The snippet manager 121 may generate snippets which define operation information necessary for offloading query computations, based on the query optimized by the query engine 110, and may deliver the generated snippets to the snippet scheduler 122. The snippets refer to offloading execution codes on which some query computations to be processed by the CSD storages 200-1, 200-2, . . . , 200-n, a block address of a file to be scanned, and a buffer address of the DBMS to store a result of computation are recorded.

The snippet scheduler 122 may schedule the snippets generated by the snippet manager 121 for the CSDs. The buffer manager 124 may generate and manage a buffer for collecting a result of offloading by the CSDs 200-1, 200-2, . . . , 200-n, that is, a result of performing some query computations by snippet processing, and a buffer for storing a final query execution result by merging collected results.

The ECC manager 123 may be configured to manage an external computational cache (ECC), and to synchronize the ECC with an internal computational cache of the CSD storage 200, which will be described below. The ECC is a repository that caches frequently accessed data blocks in order to increase a data access speed, and may be configured to minimize disk I/O latency by reducing query offloading. This will be described in detail below.

Figure 3:
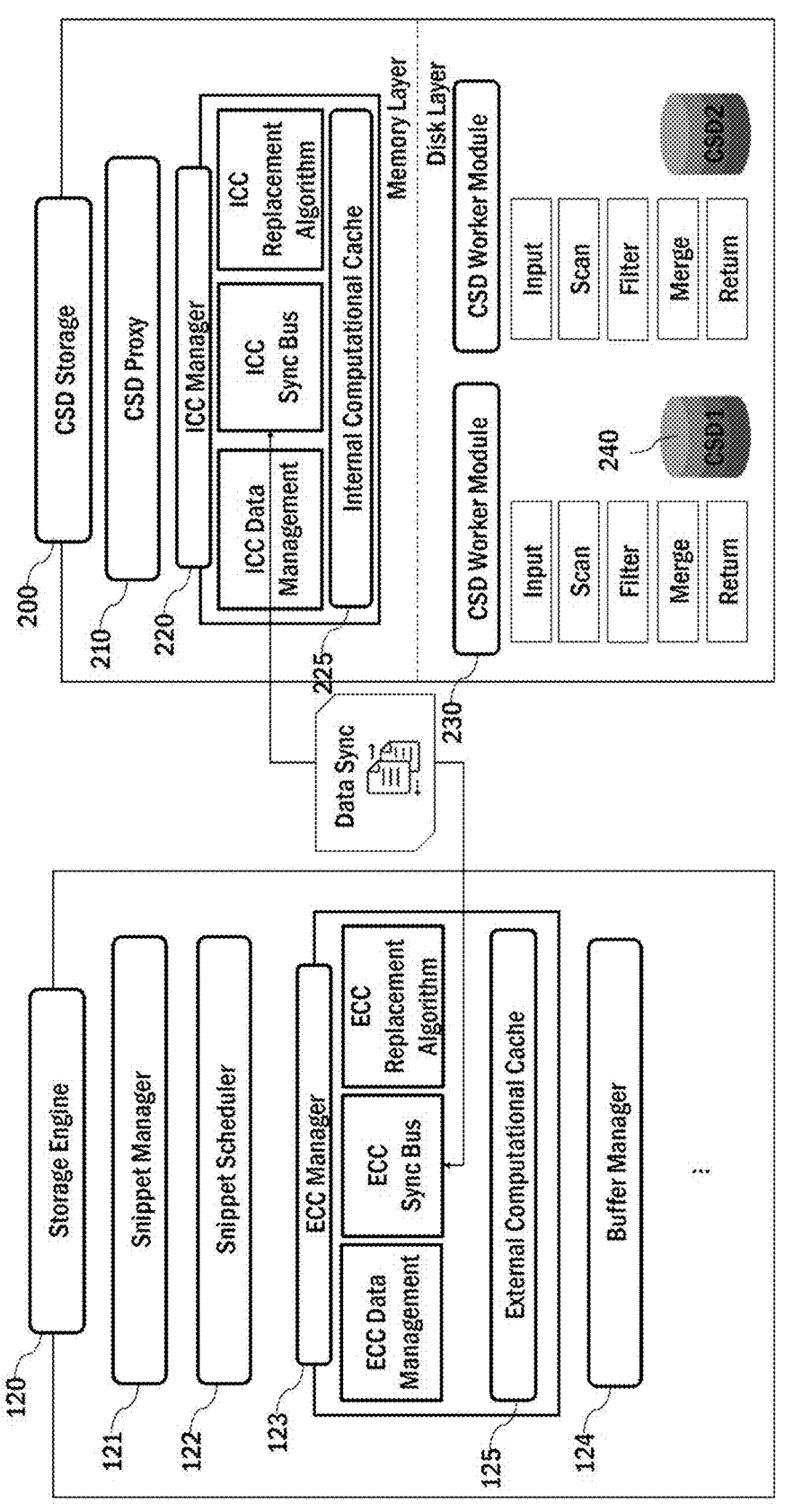
FIG. 3 is a view illustrating a configuration of a CSD storage.

FIG. 3 is a view illustrating a configuration of the CSD storages 200-1, 200-2, . . . , 200-n shown in FIG. 1. For the convenience of understanding and explanation, only one CSD storage 200 representing the CSD storages 200-1, 200-2, . . . , 200-n is illustrated in FIG. 3.

As shown in FIG. 3, the CSD storage 200 may include a CSD proxy 210, an ICC manager 220, a CSD work module 230, and a CSD 240.

The CSD proxy 210 may be configured to support communication between the storage engine 120 and the CSD storage 200. The CSD work module 230 may perform scanning, filtering, merging operations in the CSD 240 according to a snippet received from the storage engine 120.

The ICC manager 220 may be configured to manage an ICC 225, and may store, in the ICC 225, block data scanned from the CSD 40 by the CSD work module 230.

An ECC 125 and the ICC 225 may be periodically synchronized by interworking between an ECC sync bus of the ECC manager 123 and an ICC sync bus of the ICC manager 220. To this end, the ECC 125 may reduce snippet offloading, and the ICC 225 may reduce snippet processing by the CSD work module 230.

Figure 4:
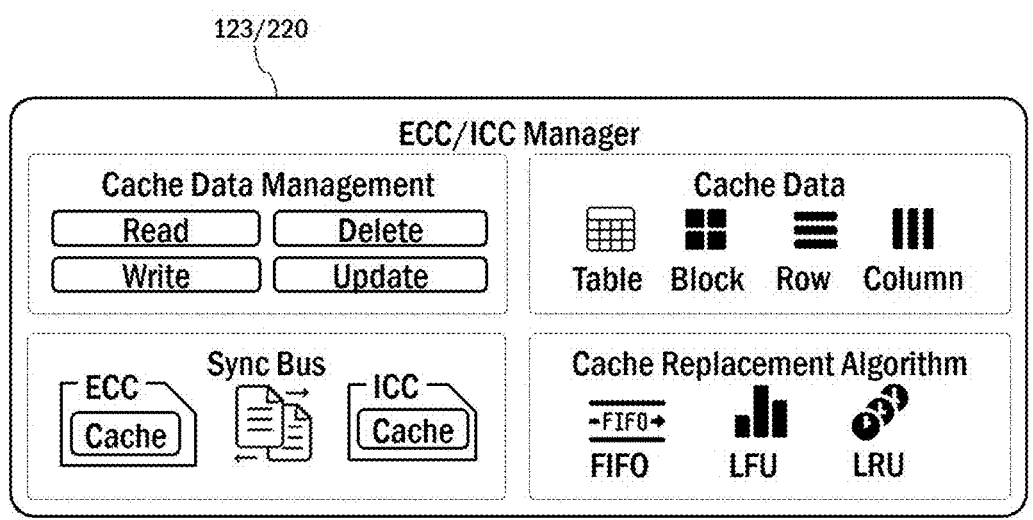
FIG. 4 is a view illustrating a configuration of an external computational cache (ECC) manager and an internal computational cache (ICC) manager.

Since the ECC manager 123 and the ICC manager 220 have common functions, the ECC manager 123 and the ICC manager 220 may be integrated into one configuration and illustrated in FIG. 4. As shown in FIG. 4, the ECC/ICC manager 123/220 may be configured to manage a data block caching operation of the ECC/ICC 125/225, and may manage input, deletion, correction of cache data.

Specifically, a cache data management module of the ECC/ICC manager 123/220 may manage reading, writing, deleting, and updating of cache data, and particularly, the updating function may refine data stored in the ECC/ICC 125/225 by updating a data block corresponding to a frequently accessed index, frequently accessed row and column data, and resulting data on join computation frequently performed. A format of data stored in the ECC/ICC 125/225 may be managed in the format of a table, a block, a row, and a column. A storage format may be determined according to a purpose of use and a data format stored in a CSD.

The ECC/ICC manager 123/220 may perform synchronization between the ECC 125 and the ICC 225 by performing cache monitoring through a cache sync bus. A cache replacement module of the ECC/ICC manager 123/220 may replace a cache when the cache is full with data or a dirty page is generated, and may prevent performance degradation caused by a cache miss when the cache replacement fails.

Figure 5:
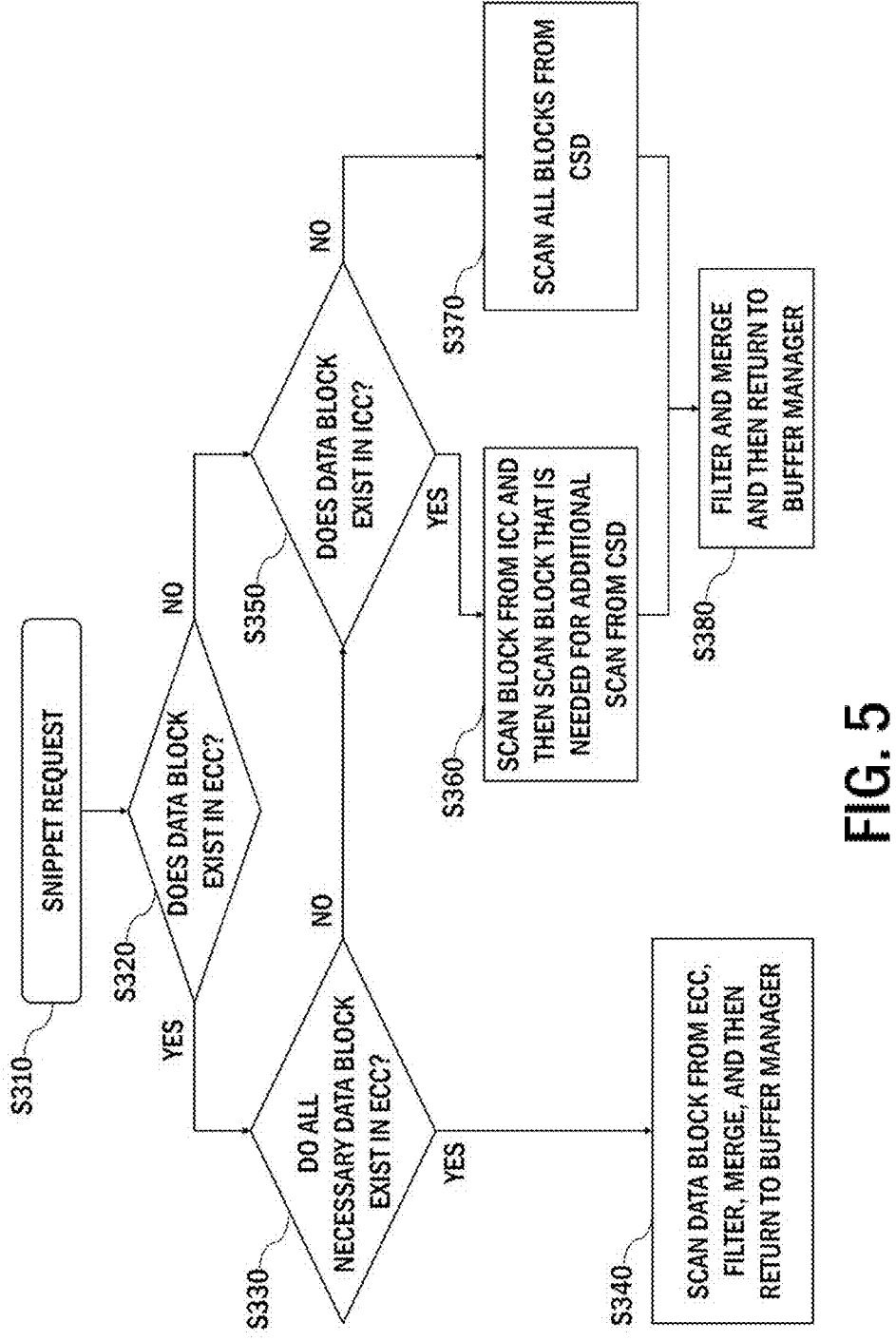
FIG. 5 is a view illustrating a snippet processing method according to another embodiment of the disclosure.

FIG. 5 is a view illustrating a flow of a snippet processing method according to another embodiment of the disclosure. The snippet processing method is a procedure for processing snippets by distinguishing ECC scanning, ICC scanning, and CSD scanning by using the ECC 125 and the ICC 225.

As shown in FIG. 5, when generation and processing of a snippet are requested by the snippet manager 121 of the storage engine 120 for snippet offloading (S310), the ECC manager 123 may identify whether a data block exists in the ECC 125 (S320).

When the data block exists in the ECC 125 (S320—YES), the ECC manager 123 may identify whether all of the data blocks that are recorded on the snippet and need to be scanned exist in the ECC 125 (S330).

When all of the data blocks that need to be scanned exist in the ECC 125 (S330—YES), the ECC manager 123 may process the snippet in the ECC 125 (S340). Specifically, at step S340, the ECC manager 123 may scan, filter, and merge the data blocks in the ECC 125, and returns a result of performing the operations to the buffer manager 124.

On the other hand, when all of the data blocks that need to be scanned do not exist in the ECC 125 (S330—NO), the snippet scheduler 122 may deliver the snippet to the CSD storage 200, and the ICC manager 220 of the CSD storage 200 may identify whether the data block exists in the ICC 225 (S350). This step is performed considering that the ICC 225 has a data block that is not synchronized with the ECC 135.

When the data block exists in the ICC 225 (S350—YES), the ICC manager 130 may scan the data block that is recorded on the snippet and needs to be scanned from the ICC 225, and the CSD work module 230 may scan a data block that does not exist in the ICC 225 from the CSD 240 (S360).

Data scanning at step S360 may be performed only for other data blocks that are not scanned in the ECC 135. When all of the data blocks that are not scanned in the ECC 135 exist in the ICC 225, data block scanning in the CSD 240 may not be performed.

The ICC manager 130 and the CSD work module 230 may filter and merge the data blocks which are scanned at step S360, and may return a result of performing the operations to the buffer manager 124 of the storage engine 120 (S380).

On the other hand, when it is identified that the data block does not exist in the ECC 125 (S320—NO), the snippet scheduler 122 may deliver the snippet to the CSD storage 200, and the ICC manager 220 of the CSD storage 200 may identify whether the data block exists in the ICC 225 (S350). This is also performed considering that the ICC 225 has a data block that is not synchronized with the ECC 135.

When the data block exists in the ICC 225 (S350—YES), the ICC manager 130 may scan the data block that is included in the snippet and needs to be scanned from the ICC 225, and the CSD work module 230 may scan a data block that does not exist in the ICC 225 from the CSD 240 (S360).

The ICC manager 130 and the CSD work module 230 may filter and merge the data blocks which are scanned at step S360, and may return a result of performing the operations to the buffer manager 124 of the storage engine 120 (S380).

On the other hand, when the data block does not exist in the ICC 225 (S350—NO), the CSD work module 230 may scan all data blocks from the CSD 240 (S370). The CSD work module 230 may filter and merge the data blocks which are scanned at step S370, and may return a result of performing the operations to the buffer manager 124 of the storage engine 120 (S380).

Up to now, the dynamic data block caching automation applying method for high-speed data access based on the computational storage has been described with reference to preferred embodiments.

In the above-described embodiments, the ECC is introduced in the DBMS and the ICC is introduced in the CSD and the ECC and the ICC are synchronized with each other, so that a load even in the CSD for reducing a load of the DBMS is reduced through snippet offloading reduction, snippet processing reduction, and high-speed query processing is enabled by disk I/O optimized data access.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A query execution method comprising:

synchronizing, by a database management system (DBMS), an external computational cache (ECC) which is a cache of the DBMS and an internal computational cache (ICC) which is a cache of a computational storage in which a database (DB) is established;

generating, by the DMBS, an offloading execution code that defines operation information necessary for query computation offloading based on a query requested by a client; and processing, by the DBMS, the offloading execution code by using the ECC and the ICC which are synchronized, wherein the method further comprises:

processing the offloading execution code by distinguishing by at least one of ECC scanning, ICC scanning, computational storage driver (CSD) scanning by using the ECC and the ICC which are synchronized, wherein the processing comprises:

performing a first identification of identifying, by the DMBS, whether data exists in the ECC;

performing a second identification of, when it is identified that the data exists in the ECC at the first identification, identifying, by the DBMS, whether all of the data that is recorded on the offloading execution code and needs to be scanned exist in the ECC; and when it is identified that all of the data exist in the ECC at the second identification, processing, by the DBMS, the offloading execution code in the ECC, and wherein the method further comprises, when it is identified that all data required by the offloading execution code exists in the ECC, refraining, by the DBMS, from delivering the offloading execution code to the computational storage.

2. The query execution method of claim 1, further comprising:

when it is identified that all of the data do not exist in the ECC at the second identification step, delivering, by the DBMS, the offloading execution code to the computational storage;

performing a third identification of identifying, by the computational storage, whether data exists in the ICC; and when it is identified that the data exists in the ICC at the third identification, scanning, by the computational storage from the ICC, the data that is recorded on the offloading execution code and needs to be scanned.

3. The query execution method of claim 2, further comprising scanning, by the computational storage from a CSD, data that does not exist in the ICC.

4. The query execution method of claim 1, further comprising:

when it is identified that the data does not exist in the ECC at the first identification, delivering, by the DBMS, the offloading execution code to the computational storage;

performing a fourth identification of identifying, by the computational storage, whether the data exists in the ICC; and when it is identified that the data exists in the ICC at the fourth identification, scanning, by the computational storage from the ICC, the data that is included in the offloading execution code and needs to be scanned.

5. The query execution method of claim 4, further comprising scanning, by the computational storage from a computational storage driver (CSD), data that does not exist in the ICC.

6. The query execution method of claim 4, further comprising, when it is identified that the data does not exist in the ICC at the fourth identification, scanning, by the computational storage, all of the data that needs to be scanned from the CSD.

7. A database (DB) system comprising:

a computational storage in which a DB is established; and a database management system (DBMS) comprising one or more processors configured to synchronize an external computational cache (ECC) and an internal computational cache (ICC) of the computational storage, to generate an offloading execution code that defines operation information necessary for query computation offloading based on a query requested by a client, and to process the offloading execution code by using the ECC and the ICC which are synchronized, wherein the one or more processors of the DBMS are further configured to:

process the offloading execution code by distinguishing by at least one of ECC scanning, ICC scanning, computational storage driver (CSD) scanning by using the ECC and the ICC which are synchronized, wherein the processing comprises:

performing a first identification of identifying, by the DMBS, whether data exists in the ECC;

performing a second identification of, when it is identified that the data exists in the ECC at the first identification, identifying, by the DBMS, whether all of the data that is recorded on the offloading execution code and needs to be scanned exist in the ECC; and when it is identified that all of the data exist in the ECC at the second identification, processing, by the DBMS, the offloading execution code in the ECC, and wherein the one or more processors of the DBMS are further configured to conditionally refrain from transmitting the offloading execution code to the computational storage when the ECC contains all data required for execution.

8. The system of claim 7, wherein the one or more processors of the DBMS are configured to, when it is identified that all of the data do not exist in the ECC at the second identification, deliver the offloading execution code to the computational storage, and wherein the computational storage is configured to perform a third identification of identifying whether data exists in the ICC, and wherein the computational storage is configured to, when it is identified that the data exists in the ICC at the third identification, scan, from the ICC, the data that is recorded on the offloading execution code and needs to be scanned.

9. The system of claim 8, wherein the computational storage is configured to scan, from a CSD, data that does not exist in the ICC.

10. The system of claim 7, wherein the one or more processors of the DBMS are configured to, when it is identified that the data does not exist in the ECC at the first identification, deliver the offloading execution code to the computational storage, wherein the computational storage is configured to perform a fourth identification of identifying whether the data exists in the ICC, and wherein the computational storage is configured to, when it is identified that the data exists in the ICC at the fourth identification, scan, from the ICC, the data that is included in the offloading execution code and needs to be scanned.

11. The system of claim 10, wherein the computational storage is configured to scan, from a computational storage driver (CSD), data that does not exist in the ICC.

12. The system of claim 10, wherein, when it is identified that the data does not exist in the ICC at the fourth identification, the computational storage is configured to scan all of the data that needs to be scanned from the CSD.

13. A query execution method comprising:

generating, by a database management system (DMBS), an offloading execution code that defines operation information necessary for query computation offloading based on a query requested by a client; and processing, by the DBMS, the offloading execution code by using an external computational cache (ECC) which is a cache of the DBMS, wherein the method further comprises:

processing the offloading execution code by distinguishing by at least one of ECC scanning, ICC scanning, computational storage driver (CSD) scanning by using the ECC and the ICC which are synchronized, wherein the processing comprises:

performing a first identification of identifying, by the DMBS, whether data exists in the ECC;

performing a second identification of, when it is identified that the data exists in the ECC at the first identification, identifying, by the DBMS, whether all of the data that is recorded on the offloading execution code and needs to be scanned exist in the ECC; and when it is identified that all of the data exist in the ECC at the second identification, processing, by the DBMS, the offloading execution code in the ECC, and wherein the method further comprises, when it is identified that all data required by the offloading execution code exists in the ECC, refraining, by the DBMS, from delivering the offloading execution code to the computational storage.

* * * * *